US007409334B1

(12) United States Patent
Shoemaker

(10) Patent No.: US 7,409,334 B1
(45) Date of Patent: Aug. 5, 2008

(54) METHOD OF TEXT PROCESSING

(75) Inventor: James Edward Shoemaker, Arlington, VA (US)

(73) Assignee: The United States of America as represented by the Director, National Security Agency, Washington, DC (US)

( * ) Notice: Subject to any disclaimer, the term of this patent is extended or adjusted under 35 U.S.C. 154(b) by 679 days.

(21) Appl. No.: 10/896,803

(22) Filed: Jul. 22, 2004

(51) Int. Cl.
*G06F 17/28* (2006.01)
*G06F 17/20* (2006.01)

(52) U.S. Cl. ............... 704/8; 704/1; 704/9; 704/10

(58) Field of Classification Search ............. 704/1–10, 704/258–260, 270, 276–277, E15.003–E15.006, 704/E11.011, E13.001–E13.014; 341/1–10
See application file for complete search history.

(56) References Cited

U.S. PATENT DOCUMENTS

| | | | | |
|---|---|---|---|---|
| 4,991,094 A * | 2/1991 | Fagan et al. ................. | 704/9 |
| 5,225,981 A * | 7/1993 | Yokogawa .................. | 704/2 |
| 5,251,129 A * | 10/1993 | Jacobs et al. ................ | 709/9 |
| 5,323,316 A * | 6/1994 | Kadashevich et al. ........ | 704/9 |
| 5,475,587 A * | 12/1995 | Anick et al. ................ | 704/9 |
| 5,651,095 A * | 7/1997 | Ogden ...................... | 704/260 |
| 5,794,177 A | 8/1998 | Carus et al. | |
| 5,870,700 A * | 2/1999 | Parra ....................... | 704/9 |
| 5,946,648 A * | 8/1999 | Halstead, Jr. et al. ......... | 704/9 |
| 6,038,527 A * | 3/2000 | Renz ....................... | 704/9 |
| 6,101,492 A * | 8/2000 | Jacquemin et al. ........... | 707/3 |
| 6,236,959 B1 | 5/2001 | Weise | |
| 6,405,161 B1 | 6/2002 | Goldsmith | |
| 6,415,250 B1 | 7/2002 | van den Akker | |
| 6,430,557 B1 * | 8/2002 | Gaussier et al. ............. | 707/5 |
| 6,446,133 B1 * | 9/2002 | Tan et al. .................. | 709/245 |
| 6,470,307 B1 * | 10/2002 | Turney ..................... | 704/9 |
| 6,539,348 B1 * | 3/2003 | Bond et al. ................. | 704/9 |
| 6,676,412 B1 * | 1/2004 | Masterson et al. ........... | 434/169 |
| 6,968,308 B1 * | 11/2005 | Brockett et al. ............. | 704/9 |
| 2005/0091031 A1 * | 4/2005 | Powell et al. ............... | 704/4 |

* cited by examiner

*Primary Examiner*—Talivaldis Ivars Smits
*Assistant Examiner*—David Kovacek
(74) *Attorney, Agent, or Firm*—Jennifer P. Ferragut

(57) ABSTRACT

A method of text processing by receiving textual units. Then, select a language and a textual unit. Identify the selected textual unit's stem and suffix. Search a rules database for the suffix. If a base suffix is found in the rules database, combine it with the stem to form a lemma. Search a lexicon database for the lemma. If the lemma is found, a model number from the lexicon database is retrieved and cross-referenced with the rules database to obtain all inflected suffixes for the selected textual unit. Combine the inflected suffixes with the stem to form inflected forms. Output a subset of inflected-forms and information associated with the lemma and inflected suffixes. The method is repeated for unprocessed textual units. If the language selected is Russian or Somali, the textual units are processed separately.

16 Claims, 2 Drawing Sheets

METHOD OF TEXT PROCESSING

FIELD OF THE INVENTION

This invention relates to linguistics and, more specifically, to natural language processing.

BACKGROUND OF THE INVENTION

Lexical morphology involves the analysis of inflections, derivations and alternate forms of words. For example, when switching from "swim" in the present tense to "swam" in the past tense, the shape of the base word "swim" is changed. In the field of morphology such transformations are referred to as conjugation and declension, and further is an example of morphological inflection. In English, "a" changes to "an" before a vowel sound, but both forms are still thought of as manifestations of the same indefinite article. English speakers know intuitively that "was", "were", "is", and "been" are all re-shapings of the base form "to be."

Though a human may be able to recognize a word as being a tense of a certain base verb, or some other derivation of a base word, the fact that a computer can not make this inherent connection is problematic in many fields. The field of language interpretation is one such field. For example, when a translator inputs a word into a computer translation system, the first thing the computer must do in order to look up the translation of this word is to figure out the dictionary lookup form of the word. For example, if the word to be translated is "fought", the word searched for would be "fight." In typical dictionaries, words are not listed under inflected forms, but under a base form of the word, which is thought of as the head member of a whole class of related forms under a given part of speech. Words in heavily-inflected languages have scores of inflected forms, and it would be impractical in most cases to simply lists all these forms for every word in the language. Because this task is so difficult, a computational algorithm is necessary to analyze all the morphological variations for words in these languages.

Prior to translation, the results of morphological processing are analyzed. To narrow the search for variants of the base word performed by the morphological text processor, many analyzers allow the user to specify certain characteristics for the word, such as the part of speech or tense of the desired word. Though many systems have been developed to morphologically analyze languages, none perform all the tasks necessary to do a complete analysis, especially for heavily inflected languages.

U.S. Pat. No. 5,794,177, entitled "METHOD AND APPARATUS FOR MORPHOLOGICAL ANALYSIS AND GENERATION OF NATURAL LANGUAGE TEXT," discloses a system for generating morphological data for a specified word. To accomplish this the system isolates a single word from a stream of text, strips that word to its base form and morphologically transforms that word using paradigms contained in the system memory. The word can be transferred from one form to another if the user requests a word matching only a specific part of speech, or several forms of the word can be generated if the user requests all words fitting a specified criteria. The present invention does not use the method of this invention for text processing. U.S. Pat. No. 5,794,177 is hereby incorporated by reference into the specification of the present invention.

U.S. Pat. No. 6,236,959, entitled "SYSTEM AND METHOD FOR PARSING A NATURAL LANGUAGE INPUT SPAN USING A CANDIDATE LIST TO GENERATE ALTERNATIVE NODES," discloses a system that parses a stream of text containing problematic word spans. Problematic word spans are strings of words containing one or more words that have multiple meanings. The system generates alternative parses for each of these words or word groups and, in a preferred embodiment, proceeds to analyze the parsed strings based on the parts of speech of the parsed words. The present invention does not parse words in this manner. U.S. Pat. No. 6,236,959 is hereby incorporated by reference into the specification of the present invention.

U.S. Pat. No. 6,405,161, entitled "METHOD AND APPARATUS FOR LEARNING THE MORPHOLOGY OF A NATURAL LANGUAGE," discloses a system that performs a morphological analysis of a natural language. The system takes each word of a series of input words and breaks it down to determine the base form, prefixes, and suffixes. This information is used to create a morphological database for the natural language. The present invention does not derive the morphology of a language as does the system of this invention. U.S. Pat. No. 6,405,161 is hereby incorporated by reference into the specification of the present invention.

U.S. Pat. No. 6,415,205, entitled "SYSTEM AND METHOD FROM IDENTIFYING LANGUAGE USING MORPHOLOGICALLY-BASED TECHNIQUES," discloses a system that identifies the language of input text based on the morphology of the text. To accomplish this, the system parses the words and analyzes the portions of the words using the morphological characteristics (e.g. stems, prefixes and suffixes) of those partial words. The parsed word is compared to information in a database representing the morphological characteristics of different languages to determine the language of the input text. The present invention does not perform this type of morphological analysis. U.S. Pat. No. 6,415,250 is hereby incorporated by reference into the specification of the present invention.

The difficulty in morphological text processing of languages in ensuring that all variant forms of an input word are products of the analysis. These variant forms include not only the standard inflected forms, but also forms that result from exceptions to traditional grammatical rules. This task is particularly difficult when analyzing heavily inflected languages. It is therefore desirable in the art to have a method of morphological text processing that provides all inflected forms for any input word or group of words. It is further desirable in the art to have a method of morphological text processing that provides all inflected forms for any input word or group of words of a highly inflected language.

SUMMARY OF THE INVENTION

It is an object of the present invention to provide a morphological text processing method that provides all inflected forms for an input words or group of words.

It is a further object of the present invention to provide a morphological text processing method that provides all inflected forms, or any subset thereof, for an input word or group of words.

It is another object of the present invention to provide a morphological text processing method that provides all inflected forms, or any subset thereof, for an input word or group of words of a highly inflected language.

The present invention is a method of text processing. The first step of the method is receiving at least one textual unit, where each textual unit includes at least one sub-textual unit.

The second step of the method is selecting a language.

The third step of the method is inserting delimiters between adjacent textual units if a plurality of textual units without delimiters is received.

The fourth step of the method is selecting one of said delimited textual units.

The fifth step of the unit is, if the selected language is a language selected from the group of languages consisting of Russian, Somali, or any other user defined language, then, (i) getting the morphology of the selected textual unit from a corresponding look-up table, (ii) outputting the corresponding input in the look-up table; and (iii) if there are any unprocessed textual units, selecting one of said unprocessed textual units and returning to substep (i), otherwise stopping.

The sixth step of the method is setting a value n equal to the total number of sub-textual units in the selected textual unit and setting a value s equal to n.

The seventh step of the method is setting a test-suffix equal to the rightmost s sub-textual units in said selected textual unit and setting stem equal to n−s leftmost sub-textual units in said selected textual unit.

The eighth step of the method is comparing the test-suffix to an inflected suffix field for each entry within a rules database, where each entry in said rules database further includes a base-suffix field, a model number field, a part of speech field, and a morphological feature field.

The ninth step of the method is setting s equal to s−1 and returning to the seventh step of the method if no match is made in the eighth step of the method.

The tenth step of the method is identifying all model numbers from the model number field of the rules database that correspond to the inflected suffixes in the rules database that matched the test-suffix in the eighth step of the method.

The eleventh step of the method is identifying all base suffixes from the base-suffix field of the rules database that correspond to the model numbers identified in the tenth step of the method.

The twelfth step of the method is combining the stem with each base suffix identified in the eleventh step of the method.

The thirteenth step of the method is comparing the test-lemma to a lemma field for each entry in a lexicon database where each entry in said lexicon database further includes a model number field, a part of speech field, a morphological feature field, a definition field, and an exception field.

The fourteenth step of the method is, if no match is found in the thirteenth step of the method, outputting a message to that effect, selecting the next unprocessed textual unit if any and returning to the sixth step of the method, otherwise stopping.

The fifteenth step of the method is identifying a model number for each lemma that matches the test lemma.

The sixteenth step of the method is identifying each entry in the rules database that has a model number that matches one of the model numbers identified in the fifteenth step of the method.

The seventeenth step of the method is combining the stem with each inflected suffix field of an entry identified in the sixteenth step of the method to form inflected forms of the textual unit.

The eighteenth step of the method is outputting a user-definable subset of the result of the seventeenth step of the method and a user-definable subset of the corresponding entries in the rules database and the lexicon database.

The nineteenth step of the method is selecting an unprocessed textual unit and returning to the sixth step of the method if there are any unprocessed textual units.

DETAILED DESCRIPTION OF THE PREFERRED EMBODIMENT

Figure 1:
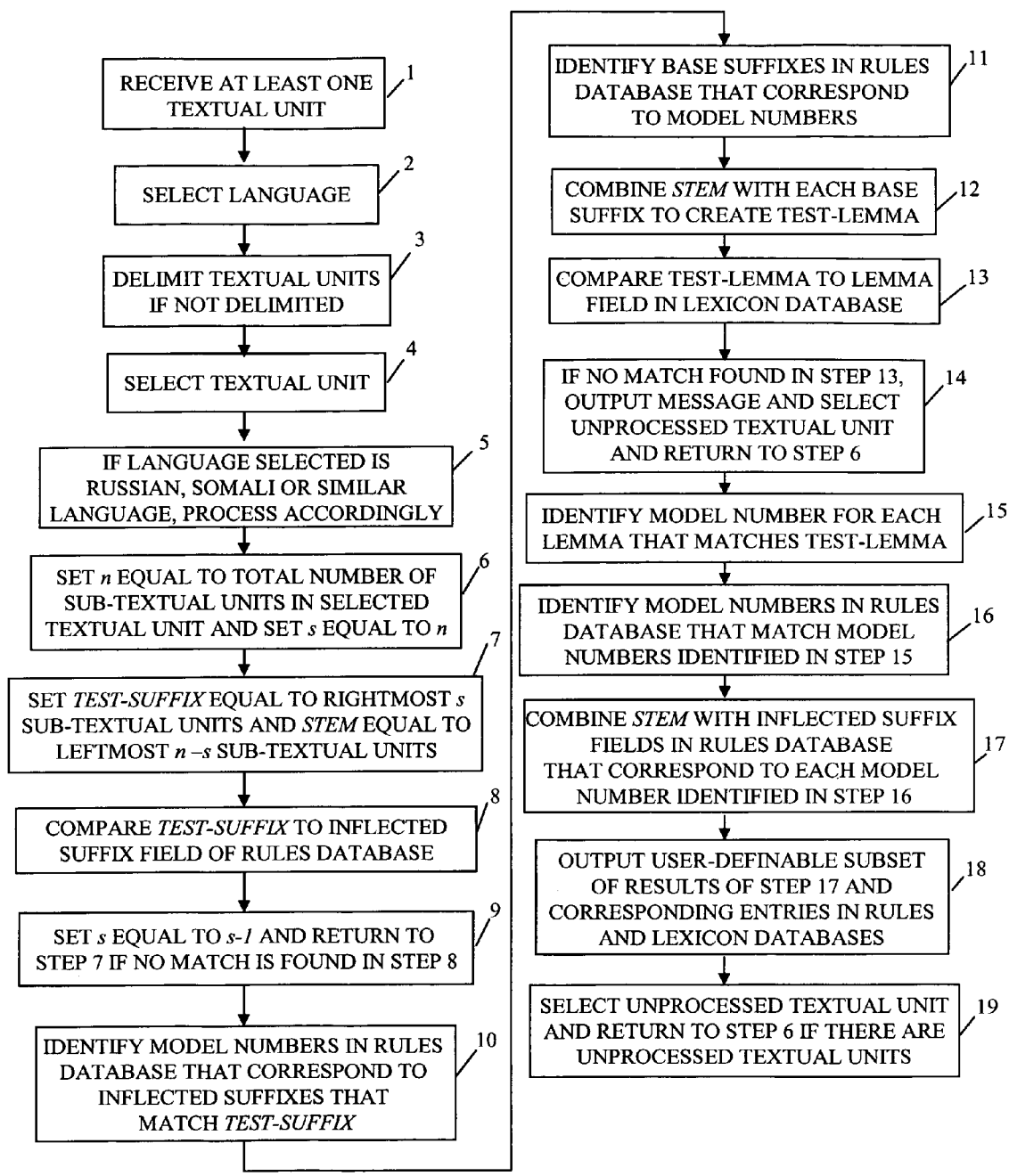
FIG. 1 is a flowchart of the steps of the present invention.

The present invention is a method of morphological text processing. FIG. 1 is a list of the steps of the method of the present invention. The first step 1 of the method is receiving at least one textual unit, where each textual unit includes at least one sub-textual unit. A textual unit is any distinct, independent string of letters or symbols that comprise a word. For example, a textual unit may be an English word composed of multiple letters from the Latin alphabet, a Chinese symbol representing a word, or a Japanese word comprised of Kanji symbols. Many other textual units are possible and will vary depending on the language, as would be obvious to one of skill in the art.

A sub-textual unit is a subset of a word within a single textual unit, typically a character or portion of a symbol. Different languages use different methods for representing words. For example, English uses combinations of letters from the Latin alphabet to represent words, each letter comprising a sub-textual unit. Japanese uses Kanji symbols, each Kanji symbol typically comprising a single sub-textual unit. As is obvious to one of skill in the art, the specific characters or symbols that comprise a sub-textual unit will depend on the language at issue.

The second step 2 of the method is selecting a language. The language selected is the language of the textual units. As will become apparent with reference to the steps described in further detail below, analysis of each textual unit depends on proper identification of the language of the textual units to be analyzed in the method. Any language can be analyzed using the method of the present invention as would be obvious to one of skill in the art, such as English, French, Albanian, Basque, Greek, Turkish, Hindi or Japanese.

The third step 3 of the method is inserting delimiters between adjacent textual units if the input includes a plurality of textual units without delimiters. Some languages provide for multiple sub-textual units to be included in a single textual unit. For example, a single string of Hebrew letters may include multiple words or textual units. As would be obvious to one of skill in the art, many other languages allow multiple textual units to be incorporated into a single string of characters or a single symbol and the manner in which these other languages incorporate multiple textual units into a single string of characters or a single symbol will depend on the specific language. To perform an analysis according to the preferred embodiment of the method, it must be possible to select a single, identifiable word. A delimiter defines the bounds of an individual word, thus breaking a string of characters of a symbol into its individual textual units. Any suitable method of delimiting textual units within a single may be used in combination with the present invention, many of which are known and commonly used by those skilled in the art.

The fourth step 4 of the method is selecting one of said delimited textual units. As was discussed in detail previously, a single textual unit represents a single word. A user-definable textual unit may be selected, however in the preferred embodiment the first textual unit in the string of textual units is selected. A textual-unit can be selected using any conventional method, many of which are well known and commonly used in the art, such as inputting the desired textual unit with a keyboard.

The fifth step 5 of the method is if the selected language is a language selected from the group of languages consisting of Russian, Somali, or any other user defined language, then, (i) getting the morphology of the selected textual unit from a corresponding look-up table, (ii) outputting the corresponding input in the look-up table; and (iii) if there are any unprocessed textual units, selecting one of said unprocessed textual units and returning to substep (i), otherwise stopping. In some cases, such as with Russian and Somali, languages are most conveniently analyzed using a static analysis technique. This is often because the morphology of the language is particularly complex and does not lend itself to the dynamic techniques employed by this method as described in more detail below. As a result, if one of the languages belonging to the group defined in the fifth step 5 of the method is selected in the second step 2 of the method, an analysis as outlined in the fifth step 5 of the method is used for all textual units in the selected language.

Figure 2:
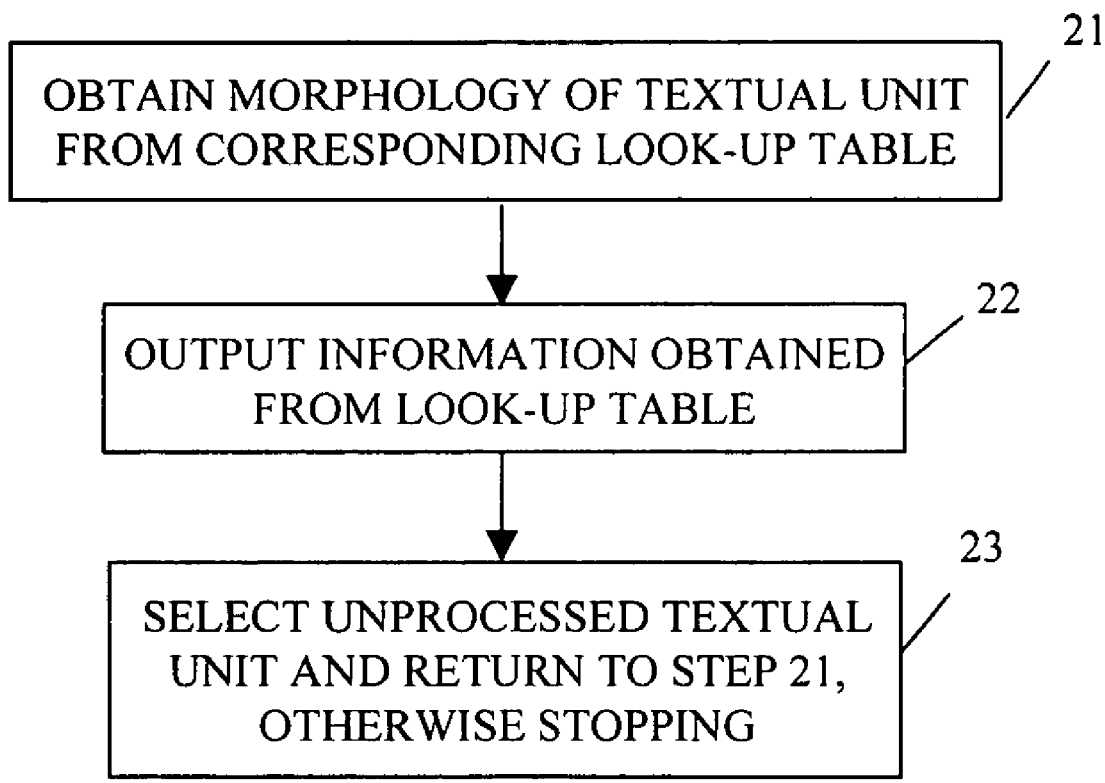
FIG. 2 is a flowchart detailing the steps of the fifth step of the method in FIG. 1.

FIG. 2 is a list of steps to analyze a textual unit according to the fifth step 5 of the method listed in FIG. 1. The first step 21 in FIG. 2 according to this method is obtaining the morphology of the first selected textual unit from a corresponding look-up table. As was explained earlier, morphology is information describing the formation of the textual unit such as inflectional, derivational, and compositional information. The information may include such basic sub-units as prefixes and suffixes. A look-up table for each language will include morphological information for each word in that language. The appropriate information is retrieved from the table for the selected textual unit in the first step 21 of the method.

The second step 22 of the method is outputting the corresponding information retrieved from the look-up table. The morphological data retrieved can be output in any conventional format, such as HTML, XML, or plaintext, as would be obvious to one of skill in the art.

The third step 23 of the method is selecting one of the unprocessed textual units and returning to the first step 21 of the method if there are any unprocessed textual units, otherwise stopping. If unprocessed textual units remain, any unprocessed textual unit is selected using any conventional means, many of which are well known and commonly used in the art. Selection of textual units was discussed in greater detail above. In the preferred embodiment, if a string of textual units exists the first unprocessed textual unit in the string is selected.

The sixth step 6 of the method shown in FIG. 1 is setting n equal to the total number of sub-textual units in the selected textual unit and setting s equal to n. As was discussed in detail above, a sub-textual unit is a single character or symbol of a textual unit. The variable n is defined as the number of sub-textual units in the selected textual unit. The variable s is set to equal n.

The seventh step 7 of the method is setting a test-suffix equal to the rightmost s sub-textual units in said selected textual unit and setting stem equal to n−s leftmost sub-textual units in said selected textual unit. As is obvious with reference to the sixth step 6 of the method, because n is initially set to equal s, the test suffix will initially comprise the entire textual unit and the stem will entirely comprise no sub-textual units.

The eighth step 8 of the method is comparing the test-suffix to an inflected suffix field for each entry within a rules database, where each entry in said rules database further includes a base-suffix filed, a model number field, a part of speech field, and a morphological feature field. A separate rules database preferably exists for each language. The rules database for the language selected in the second step 2 is referenced in the eighth step 8 of the method. The rules database includes both morphological information on the textual units and other information that is useful in analysis as will become clear with reference to the steps described in greater detail below. The inflected suffix field, for example, contains base forms of words. A base form of a word is a word that does not include a prefix. Using the word "replay" as an example, "play" is a base form having a prefix of "re." A base form may be any part of speech, such as a noun verb or adjective, as would be obvious to those skilled in the art. Other fields of the rules database may be defined by the user according to user preferences. Certain fields will be discussed in further detail with reference to the detailed description below.

The part of speech filed defines the part of speech to which each inflected suffix belongs. Because a given inflected suffix may be used in more than one part of speech, an inflected suffix may appear more than once in the rules database. Again, taking "replay" as an example, the inflected suffix "play" can be the verb "play" meaning "frolic" or the noun "play" meaning "a theatrical production." As a result the inflected suffix would appear twice in the rules database. Should the textual unit "replay" be input in this method, two entries from the rules database would be located in the eighth step 8 of the method.

The ninth step 9 of the method is setting s equal to s−1 and returning to the seventh step 7 of the method if no match is made in the eighth step 8 of the method. If the test-suffix initially derived in the seventh step 7 of the method does not allow an inflected suffix to be located in the eighth step 8 of the method, a new rightmost string must be derived. This is accomplished by shortening s by 1, returning to the seventh step 7 of the method, and re-defining the test-suffix.

The tenth step 10 of the method is identifying all model numbers from the model number field of the rules database that correspond to the inflected suffixes in the rules database that matched the test-suffix in the eighth step 8 of the method. The model number field of the rules database assigns all inflected suffixes derived from the same base word a unique number. Additionally, if the same base word falls under more than one part of speech, the base word will preferable receive separate numbers for each part of speech. Again taking for example the word "play," the noun "play" would be assigned one model number and the verb "play" would be assigned a different model number. The unique number is stored in the model number field. The base words are stored in the base suffix field. A base word is an uninflected word, such as the present tense of a verb, or a noun without prefix or suffix. Taking the word "play" as an example, "play" would be the base suffix for such inflected forms as "playing," "played," and "player."

The eleventh step 11 of the method is identifying all base suffixes from the base-suffix field of the rules database that correspond to the model numbers identified in the tenth step 10 of the method. After locating the model numbers associated with the inflected suffixes in the rules database, the rules database is referenced to find the base suffixes associated with the model numbers. As was discussed in detail above, each model number is associated with a single base suffix. However, a single textual unit may be associated with multiple inflected suffixes and therefore multiple base suffixes.

The twelfth step 12 of the method is combining the stem with each base-suffix identified in the eleventh step 11 of the method to create a test-lemma. A test-lemma is a textual unit that results from the combination of a stem and a base-suffix.

The stem is that portion of the textual unit that remains after the test-suffix is removed. Once the inflected suffix is removed from the textual unit what remains is the stem. Taking "replay" as an example, the inflected suffix would likely be "play" as it is highly likely a match for "play" would be found in the inflected suffix field of the rules database. Removing "play" from "replay," what remains is "re" and this is the stem for the textual unit. This stem is combined with each of the base-suffixes identified in the eleventh step 11 of the method. Taking the word "resounding" as an example, if "sound" were identified as a base-suffix in the eleventh step 11 and the stem were "re," the two parts would be combined in the twelfth step 12 to create the test-lemma "resound." If multiple base-suffixes are identified in the eleventh step 11, multiple test-lemma resulting from combinations of stem and each base-suffix will result.

The thirteenth step 13 of the method is comparing the test-lemma to a lemma field for each entry in a lexicon database where each entry in said lexicon database further includes a model number field, a part of speech field, a morphological feature field, a definition field, and an exception field. There preferably exists a lexicon database for each language that can be analyzed by the method, however the lexicon database may contain a subset of the languages or all languages according to user preferences. The lemma field of the lexicon database is populated with lemmata. A lemma is typically a canonical word, though it can be defined as any other textual unit according to user preferences. Therefore, the test-lemma is compared to the lemma field of the lexicon database in the thirteenth step 13 to determine which of the test-lemma, if any, may be a word.

In the preferred embodiment the lexicon database further includes a model number field. As was discussed in detail earlier, a model number is associated with each base-suffix. The model number field in the lexicon database associates one of these model numbers with each lemma. As is obvious from the description above, because a test-suffix is composed of stem and base-suffix, and each test-suffix is matched to a lemma, each lemma must incorporate a base-suffix. The model number associated with each lemma is the model number of this incorporated base-suffix.

In addition to the lemma field, the lexicon database preferably includes a definition field that includes a definition of each lemma included in the lemma field. The lexicon database also preferably includes a part of speech field that provides the part of speech to which each lemma belongs. According to user preferences the lexicon database may also include other fields, such as a morphological feature field. The morphological feature field may include information of interest when translating certain languages. For example, many romance languages use different words for the masculine and feminine forms. This type of information may appear in a morphological features field. Many other fields may be desirable to convey information of interest as would be obvious to one of skill in the art.

The fourteenth step 14 of the method is, if no match is found in the thirteenth step 13 of the method, outputting a message to that effect, selecting the next unprocessed textual unit if any and returning to the sixth step 6 of the method, otherwise stopping. If there is no lemma found that matches the test-lemma, a new textual unit is selected and the analysis process is begun for the unprocessed textual unit. A message is also output to the user indicating that no match was found for the processed textual unit. The message can be output in any format many of which are well known in the art, such as HTML, XML, or plaintext. Any conventional method can be used to output the message. If there remain no unprocessed textual units, the method is stopped.

The fifteenth step 15 of the method is identifying a model number for each lemma that matches the test lemma. As was discussed in detail earlier, each lemma has an associated model number. For each lemma that matches a test-lemma, the model number is identified from the model number field of the lexicon database. Methods of referencing databases to identify data are well known to those in the art, and any conventional method could be used in combination with this invention.

The sixteenth step 16 of the method is identifying each entry in the rules database that has a model number that matches one of the model numbers identified in the fifteenth step 15 of the method. As was discussed in detail earlier, each base suffix is associated with a specific model number, and each inflected suffix in the rules database is associated with a base suffix. Therefore, each inflected suffix is associated with the model number for the base suffix with which it is associated. A single base-suffix, and correspondingly a single model number, may be associated with multiple inflected suffixes. As is obvious from the more detailed discussion above, there is also one entry in each other field of the rules database associated with each inflected suffix. All entries from all fields are identified that are associated with each model number identified in the fifteenth step 15, the fields being identified for each appearance of each identified model number in the rules database. Methods of referencing databases to identify data are well known to those in the art, and any conventional method could be used in combination with this invention.

The seventeenth step 17 of the method is combining stem with each inflected suffix field of an entry identified in the sixteenth step 16 of the method to form inflected forms of the textual unit. The combination of stem and inflected suffixes in the seventeenth step 17 provides all inflected forms of the textual unit received in the first step 1. Taking the word "replay" as an example, let it be assumed that inflected suffixes would be "play," "playing," "plays" and "played" were identified as inflected suffixes in the sixteenth step 16. These would be combined with stem "re" to create the inflected forms "replay," "replaying," "replays" and "replayed."

The eighteenth step 18 of the method is outputting a user-definable subset of the result of seventeenth step 17 of the method and a user-definable subset of the corresponding entries in the rules database and the lexicon database. As was explained in detail above, every inflected suffix is associated with a model number. Each model number appears in a field of both the rules database and the lexicon database at least once. It is likely, though not necessary, that each model number will appear in the rules database multiple times. As was also explained in detail above, each model number is associated not only with an inflected suffix, but also with data in a user-definable number of additional fields in each of the lexicon database and the rules database, such as the base-suffix field, part-of-speech field, morphological feature field, definition field and exception field. The eighteenth step 18 consists outputs the data from a user-definable subset of these associated fields. The data can be output using any conventional method, many of which are well known and commonly used in the art, such as outputting the data to a computer monitor in HTML format.

The nineteenth step 19 of the method is selecting an unprocessed textual unit and returning to the sixth step 6 of the method if there are any unprocessed textual units, otherwise stopping. If multiple textual units were received in the first step 1, in the preferred embodiment the next unprocessed textual unit in the string of textual units is selected in the nineteenth step 19. However, any textual unit in the string of textual units may be selected according to user preferences.

What is claimed is:

1. A method of text processing, comprising the steps of:
   a) receiving at least one textual unit, where each textual unit includes at least one sub-textual unit;
   b) selecting a language;
   c) if a plurality of textual units are received, and said plurality of textual units do not include delimiters, then inserting delimiters between adjacent textual units;
   d) selecting one of said delimited textual units;
   e) if the selected language is selected from the group of languages consisting of Russian, Somali, user-definable language, then:
      i) getting a morphology of the selected textual unit from a corresponding look-up table;
      ii) outputting the corresponding input in the look-up table; and
      iii) if there are any unprocessed textual units from the textual units received in step (a), selecting one of said unprocessed textual units and returning to substep (i), otherwise stopping;
   f) setting a value n equal to the total number of sub-textual units in the selected textual unit and setting a value s equal to n;
   g) setting a test-suffix equal to the rightmost s sub-textual units in said selected textual unit and setting stem equal to n−s leftmost sub-textual units in said selected textual unit;
   h) comparing the test-suffix to an inflected suffix field for each entry within a rules database, where each entry in said rules database further includes a base-suffix field, a model number field, a part of speech field, and a morphological feature field;
   i) if no match is made in step (h) then setting s equal to s−1 and returning to step (g);
   j) identifying all model numbers from the model number field of the rules database that correspond to the inflected suffixes in the rules database that matched test-suffix in step (h);
   k) identifying all base suffixes from the base-suffix field of the rules database that correspond to the model numbers identified in step (j);
   l) combining stem with each base suffix identified in step (k) to create at least one test-lemma;
   m) comparing the at least one test-lemma to a lemma field for each entry in a lexicon database where each entry in said lexicon database further includes a model number field, a part of speech field, a morphological feature field, a definition field, and an exception field;
   n) if no match is found in step (m) then outputting a message to that effect, selecting the next unprocessed textual unit if any and returning to step (f), otherwise stopping;
   o) identifying a model number for each lemma that matches the test lemma;
   p) identifying each entry in the rules database that has a model number that matches one of the model numbers identified in step (o);
   q) combining stem with each inflected suffix field of each entry identified in step (p) to form inflected forms of the textual unit;
   r) outputting a user-definable subset of the result of step (q) and a user-definable subset of the corresponding entries in the rules database and the lexicon database; and
   s) if there are any unprocessed textual units selecting an unprocessed textual unit and returning to step (f).

2. The method of claim 1, further including the step of modifying stem if there is an entry in the exception field associated with the lemma in the lexicon database with the corresponding model number, the modification to the stem being in accordance with the entry in the exception field.

3. The method of claim 2, wherein each textual unit is selected from the group of textual units consisting of a word, character, and a symbol.

4. The method of claim 3, wherein each sub-textual unit is selected from the group of sub-textual units consisting of letters and symbols.

5. The method of claim 4, wherein the step of outputting a user-definable subset of the result of step (q) further comprises outputting a user-definable subset of the result of step (q) and a user-definable subset of the corresponding entries in the rules database and the lexicon database in a format selected from the group of formats consisting of a table and a narrative.

6. The method of claim 5, wherein the step of outputting a user-definable subset of the result of step (q) further comprises outputting a user-definable subset of the result of step (q) and a user-definable subset of the corresponding entries in the rules database and the lexicon database in a format selected from the group of formats consisting of Romanized format, UNICODE, XML, HTML, ASCII, and plaintext.

7. The method of claim 6, further including the step of outputting the result of each step of steps (b)-(r) of the method.

8. The method of claim 7, further including the step of identifying the inflected forms that are identical to the textual unit selected in step (d).

9. The method of claim 8, wherein the step of outputting a user-definable subset of the result of step (q) further comprises outputting only at least one inflected form that is identical to the textual unit selected in step (d) and all fields associated with said inflected suffixes included in said at least one inflected form that is identical to said received textual unit in both of said lexicon database and said rules database.

10. The method of claim 1, wherein each textual unit is selected from the group of textual units consisting of a word, character, and a symbol.

11. The method of claim 1, wherein each sub-textual unit is selected from the group of sub-textual units consisting of letters and symbols.

12. The method of claim 1, wherein the step of outputting a user-definable subset of the result of step (q) further comprises outputting a user-definable subset of the result of step (q) and a user-definable subset of the corresponding entries in the rules database and the lexicon database in a format selected from the group of formats consisting of a table and a narrative.

13. The method of claim 1, wherein the step of outputting a user-definable subset of the result of step (q) further comprises outputting a user-definable subset of the result of step (q) and a user-definable subset of the corresponding entries in the rules database and the lexicon database in a format selected from the group of formats consisting of Romanized format, UNICODE, XML, HTML, ASCII, and plaintext.

14. The method of claim 1, further including the step of outputting the result of each step of steps (b)-(r) of the method.

15. The method of claim 1, further including the step of identifying the inflected forms that are identical to the textual unit selected in step (d).

16. The method of claim 15, wherein the step of outputting a user-definable subset of the result of step (q) further comprises outputting only at least one inflected form that is identical to the textual unit selected in step (d) and all fields associated with said inflected suffixes included in said at least one inflected form that is identical to said received textual unit in both of said lexicon database and said rules database.

* * * * *